United States Patent [19]

Schroeder et al.

[11] Patent Number: 5,004,504
[45] Date of Patent: Apr. 2, 1991

[54] TRANSPARENT IRON OXIDE PIGMENTS

[75] Inventors: Rodney G. Schroeder; Anand S. G. Sharangpani, both of Holland, Mich.

[73] Assignee: BASF, N.J.

[21] Appl. No.: 485,025

[22] Filed: Feb. 26, 1990

[51] Int. Cl.$^5$ ............................................. C09C 1/22
[52] U.S. Cl. ...................................... 106/456; 423/633
[58] Field of Search ................ 106/456; 423/632, 633, 423/634; 252/62.56

[56] References Cited
U.S. PATENT DOCUMENTS
3,533,820 10/1970 Lewis et al. ................... 106/304

Primary Examiner—William R. Dixon, Jr.
Assistant Examiner—Chris Gallo
Attorney, Agent, or Firm—R. B. Harley; M. R. Chipaloski

[57] ABSTRACT

In accordance with the instant invention red transparent iron oxide pigment is prepared from yellow transparent iron oxide pigment filter cake by drying and calcining in a single operation using a spray dryer employing a nozzle of the two fluid design.

13 Claims, 1 Drawing Sheet

TRANSPARENT IRON OXIDE PIGMENTS

BACKGROUND OF THE INVENTION

The instant invention relates to transparent iron oxide pigments. More specifically, the instant invention relates to a novel process for conversion of yellow transparent iron oxide to red transparent iron oxide.

Iron oxide pigments are found in nature as mineral deposits. There are three types of iron oxide pigments which are found in nature as mineral deposits. These are limonite, hematite, and magnetite. Limonite is yellow and has a chemical formula of $Fe_2O_3.xH_2O$ where x is an integer. As can be seen from its formula, it is a hydrated iron(III)oxide. Hematite is red and has a chemical formula of $Fe_2O_3$. It is an anhydrous iron(III)oxide. Magnetite is black and has a chemical formula of $Fe_3O_4$. It is considered to be a spinal containing iron(II) and iron(III)ions.

In addition to the natural mineral deposits, iron oxide pigments can be obtained synthetically. The prior art preparation of iron oxide pigments is well known. Reference is made to various topics concerning iron oxide such as "Pigments (Inorganic)," pages 816–818, vol. 17, *Encyclopedia of Chemical Technology*, by Kirk-Othmer, 3rd edition, published by John Wiley & Sons.

Iron oxide pigments which have an average particle size less than 0.1 micron are considered to be transparent because they can transmit visible light. Stated another way, "transparent pigment" is pigment having a majority of the particles smaller than the wave length of light. Iron oxide pigments which have an average particle size greater than 0.1 microns and which cannot transmit light are considered to be opaque.

Synthetic methods for preparing iron oxide pigments generally involve the alkali precipitation of iron(II) compounds from a soluble iron(II)salt and the oxidation of the precipitated iron(II) compound to an iron(III)oxide pigment slurry. The pigment produced by such methods corresponds to the yellow hydrated iron(III)oxide previously described. The yellow pigment is recovered from the slurry by filtration, washing, and drying. Red transparent iron oxide can be prepared by calcining the yellow pigment at high temperatures.

As can be seen from the above the prior art method for preparing a red transparent iron oxide pigment from a yellow transparent iron oxide pigment filter cake requires two steps, i.e., drying and calcining. The final red oxide pigment product is then prepared by grinding the calcined pigment. Accordingly it is a purpose of the instant invention to accomplish both drying and calcining in a single step.

PATENTS OF INTEREST

U.S. Pat. No. 3,533,820 discloses the calcination of iron sulfate to iron oxide in a flash dryer.

U.S. Pat. No. 3,843,380 discloses spray drying a pumpable slurry of pigment particles which may be iron oxide at an inlet temperature not substantially in excess of about 400° F. (about 204° C.).

SUMMARY OF THE INVENTION

In accordance with the instant invention red transparent iron oxide pigment is prepared from the yellow transparent iron oxide pigment filter cake by drying and calcining in a single operation using a spray dryer employing a nozzle of the two fluid design. More specifically the instant invention is related to a process for conversion of yellow transparent iron oxide to red transparent iron oxide by atomizing a yellow transparent iron oxide aqueous mass, more particularly a filter cake, in a two fluid atomizing nozzle which comprises a central conduit and an annular conduit surrounding the central conduit. The aqueous mass of yellow transparent iron oxide is passed through the central conduit and an atomizing fluid such as compressed air or steam is forced under pressure through the annular conduit. The nozzle is positioned in a spray drying chamber whereby the atomized fluid is spray dried and calcined after which it is recovered in a conventional manner. Thus both drying and calcining are accomplished in a single step with consequent savings in time, space and expense.

DESCRIPTION OF THE DRAWING

The invention may be best understood with reference to the accompanying drawings in which.

DESCRIPTION OF THE PREFERRED EMBODIMENT

In accordance with the present invention the yellow transparent iron oxide filter cake is pumped by means of a pump 1 to a spray dryer 2 wherein the filter cake is disbursed in the form of fine droplets or in other words atomized by a two fluid nozzle 4. An important factor in the atomization of the filter cake is the use of the two fluid nozzle illustrated more particularly in FIG. 2. As is apparent to anyone skilled in the art, the filter cake is obtained by filtering the precipitated aqueous yellow iron oxide pigment slurry which accordingly is an aqueous mass of the yellow transparent iron oxide.

Figure 1:
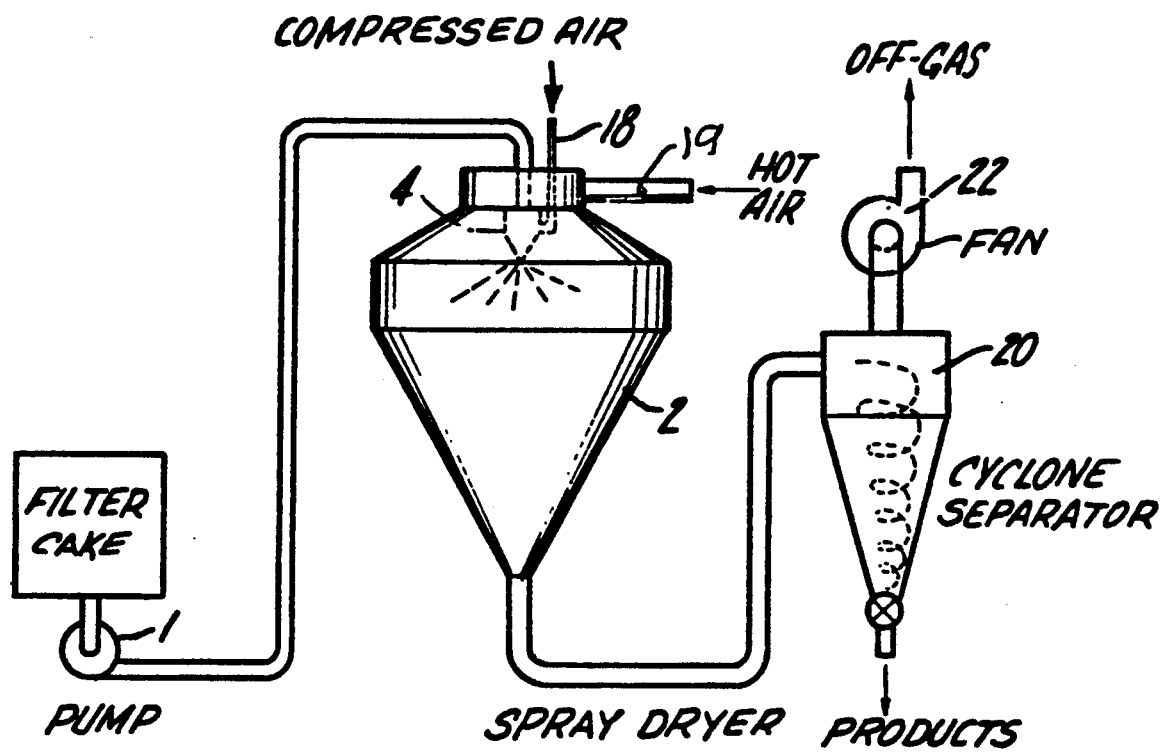
FIG. 1 is a flow diagram illustrating the method for conversion of yellow transparent iron oxide to red transparent iron oxide in accordance with the concepts of the present invention.
Figure 2:
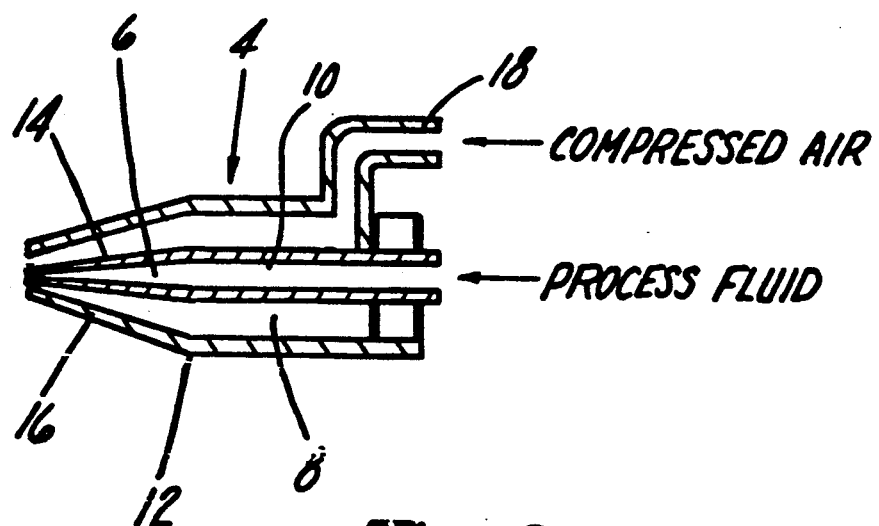
FIG. 2 is a drawing in cross section of the two fluid nozzle employed in the instant invention.

With reference more particularly to FIG. 2 it will be seen that the nozzle indicated generally at 4 comprises a central conduit 6 and an annular conduit 8. In a preferred embodiment the central conduit and the annular conduit have a cylindrical portion 10 and 12 respectively and conical portions 14 and 16. The process fluid, which as stated is an aqueous mass of yellow transparent iron oxide, is passed through the central conduit 6 while an atomizing fluid supplied through conduit 18 is forced under pressure through the annular conduit 8. The atomizing fluid may be either compressed air or super heated steam, compressed air being preferred. High pressure is required preferably from about 80 to 100 psig or even higher. The aqueous mass of yellow transparent iron oxide requires little or no pressure and thus normal pump pressure for transmitting the fluid through the pipe is all that is needed. Accordingly it enters the nozzle 4 at a pressure ranging from 0 to about 50 psig. Atomization of the obviously thick aqueous mass of the yellow transparent iron oxide pigment is achieved as the result of using a high pressure atomizing fluid such as compressed air. The two-fluid nozzle was developed by J. S. and W. R. Eakins, Inc. and Proctor and Schwartz, Inc. and such nozzles are described in the article entitled "New Easy Way Changes Paste to Powder" appearing in *Chemical Engineering* for Mar. 21, 1960 pages 83 and 84.

The atomized pigment is sprayed into the chamber of the spray dryer 2 wherein it is dried and calcined by hot or heated air, entering through conduit 19, thereby forming a plurality of discrete pigment particles. While co-current drying is shown, counter-current drying can be employed. Following drying, the particles are separated from air and water vapor in a cyclone separator 20. The free-flowing product is then bagged and shipped to bulk storage for further processing such as by grinding to produce the ultimate red transparent iron oxide pigment product.

Preferably the hot or heated air enters the dryer 2 through conduit 19 at temperatures above 400° C. in order to produce red shades. Where super heated steam is employed as the atomizing fluid, the steam temperature is preferably greater than 400° C. The most desirable shades are produced with an entering air temperature of about 500° to 600° C. The degree of calcination, i.e., the percentage of yellow converted to red is a function of time and temperature. It is a particularly advantageous aspect of this process that it is possible to produce a dry transparent iron oxide in all hues from yellow (0 calcination) to red (100 percent calcination) by adjusting temperature and/or retention time. Retention time in the dryer is controlled primarily by the size of the dryer, rate of injection and atomization of the fluid and other factors well known to those skilled in the art. The retention times can range from about 10 seconds to 50 seconds.

The drying chamber of the spray dryer is maintained under a slight negative pressure due to the draft of the exhaust fan 22. The process also permits developing exactly the right shade by wet blending batches of filter cake prior to drying which results in a reduction of dust which is inherent in the blending of dry pigments or dry particles.

As used herein throughout the application unless otherwise specified all temperatures are in degrees centigrade and all parts and percentages, etc. are by weight.

The embodiments of the invention in which an exclusive privilege or property is claimed are defined as follows:

1. A process for conversion of yellow transparent iron oxide to red transparent iron oxide comprising the steps of
    atomizing an aqueous mass of yellow transparent iron oxide in a two fluid atomizing nozzle comprising a central conduit and an annular conduit surrounding said central conduit wherein said aqueous mass of yellow transparent iron oxide is passed through said central conduit and an atomizing fluid is forced under pressure through said annular conduit,
    spraying the atomized pigment into a spray drying chamber wherein said atomized pigment is dried and calcined by heated air forming a plurality of minute discrete pigment particles and
    recovering the minute discrete red pigment particles from the spray drying operation.

2. The process of claim 1 wherein said atomizing fluid enters said nozzle at a pressure of from about 80 to 100 psig and said heated air enters said chamber at a temperature greater than about 400° C.

3. The process of claim 2 wherein the temperature of said heated air enters said chamber at about 500° to 600° C.

4. The process of claim 3 wherein the retention time in said spray drying chamber is from about 10 to 50 seconds.

5. The process of claim 4 wherein the pressure of said aqueous mass entering said nozzle is from 0 to about 50 psig.

6. The process of claim 2 wherein said atomizing fluid is compressed air.

7. The process of claim 6 wherein the temperature of said heated air entering said chamber is about 500° to 600° C.

8. The process of claim 7 wherein the retention time in said spray drying chamber is from about 10 to 50 seconds.

9. The process of claim 8 wherein the pressure of said aqueous mass entering said nozzle is from 0 to about 50 psig.

10. The process of claim 2 wherein said atomizing fluid is super heated steam at a temperature greater than about 400° C.

11. The process of claim 10 wherein the temperature of said heated air entering said chamber is about 500° to 600° C.

12. The process of claim 11 wherein the retention time in said spray drying chamber is from about 10 to 50 seconds.

13. The process of claim 12 wherein the pressure of said aqueous mass entering said nozzle is from 0 to about 50 psig.

* * * * *